United States Patent
Kurosaka et al.

(10) Patent No.: US 9,746,610 B2
(45) Date of Patent: Aug. 29, 2017

(54) OPTICAL FIBER CUTTING DEVICE AND OPTICAL FIBER CUTTING METHOD

(71) Applicant: FUJIKURA LTD., Koto-ku, Tokyo (JP)

(72) Inventors: Yuya Kurosaka, Koto-ku (JP); Makoto Iwamatsu, Koto-ku (JP); Manabu Tabata, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 0 days.

(21) Appl. No.: 13/741,801

(22) Filed: Jan. 15, 2013

(65) Prior Publication Data

US 2013/0125718 A1 May 23, 2013

Related U.S. Application Data

(63) Continuation of application No. PCT/JP2011/078187, filed on Dec. 6, 2011.

(30) Foreign Application Priority Data

Dec. 13, 2010 (JP) .................................. 2010-276848

(51) Int. Cl.
*B26D 7/08* (2006.01)
*B23D 21/14* (2006.01)
(Continued)

(52) U.S. Cl.
CPC ................. *G02B 6/25* (2013.01); *B26D 1/45* (2013.01); *B26D 1/455* (2013.01); *B26D 5/08* (2013.01);
(Continued)

(58) Field of Classification Search
CPC ........ G02B 2006/12166; G02B 6/4202; G02B 6/25; B26D 5/16; B26D 1/455;
(Continued)

(56) References Cited

U.S. PATENT DOCUMENTS 4,039,309 A * 8/1977 Albanese et al. ................ 65/433
4,607,775 A * 8/1986 Krause .......................... 225/96.5
(Continued)

FOREIGN PATENT DOCUMENTS

DE   3015645 B  *  4/1981
DE   3015645 B1    4/1981
(Continued)

OTHER PUBLICATIONS

English Translation of DE 3015645 B translated by the USPTO.*
(Continued)

*Primary Examiner* — Ghassem Alie
*Assistant Examiner* — Bharat C Patel
(74) *Attorney, Agent, or Firm* — Sughrue Mion, PLLC

(57) ABSTRACT

A cutting device for cutting an optical fiber running in a first direction includes a supporting piece having a free end and a fixed end and having resilience, a cutting blade supported by the supporting piece that comes into contact with the optical fiber to make a right angle with the optical fiber at a point of the contact, and a driving device. The driving device is configured to press the supporting piece in a second direction in a plane perpendicular to the first direction, with the second direction not intersecting with the first direction.

5 Claims, 3 Drawing Sheets

(51) Int. Cl.
*B26F 3/00* (2006.01)
*B65H 35/00* (2006.01)
*G02B 6/25* (2006.01)
*B26D 1/45* (2006.01)
*B26D 7/14* (2006.01)
*B26D 5/08* (2006.01)
*B26D 5/12* (2006.01)
*B26D 5/16* (2006.01)

(52) U.S. Cl.
CPC ............... *B26D 5/086* (2013.01); *B26D 5/12* (2013.01); *B26D 5/16* (2013.01); *B26D 7/14* (2013.01); *Y10T 83/0405* (2015.04); *Y10T 83/8717* (2015.04)

(58) Field of Classification Search
CPC . B26D 5/086; B26D 5/12; B26D 5/08; B26D 7/14; B26D 1/45; Y10T 83/8717; Y10T 83/0405
USPC ......... 225/2, 96, 101, 93, 103, 96.5; 83/170; 125/23 R
See application file for complete search history.

(56) References Cited

U.S. PATENT DOCUMENTS

| | | | | |
|---|---|---|---|---|
| 4,667,862 A | * | 5/1987 | Millar et al. | 225/2 |
| 4,790,465 A | * | 12/1988 | Fellows et al. | 225/2 |
| 5,188,268 A | * | 2/1993 | Hakoun et al. | 225/96.5 |
| 5,829,659 A | * | 11/1998 | Mansfield et al. | 225/2 |
| 5,839,338 A | * | 11/1998 | Tcholakov | 83/375 |
| 6,634,079 B1 | * | 10/2003 | Kazama | 29/564.4 |
| 7,305,169 B2 | * | 12/2007 | Honma | 385/136 |
| 2010/0044406 A1 | * | 2/2010 | Ohmura et al. | 225/2 |

FOREIGN PATENT DOCUMENTS

| | | |
|---|---|---|
| JP | 56-102805 A | 8/1981 |
| JP | 63-153505 A | 6/1988 |
| JP | 04-123009 A | 4/1992 |
| JP | 2000-343481 A | 12/2000 |
| JP | 2003-262739 A | 9/2003 |
| JP | 2005-321652 A | 11/2005 |
| JP | 2008-087137 A | 4/2008 |
| JP | 2010-134033 A | 6/2010 |
| JP | 2010-237331 A | 10/2010 |

OTHER PUBLICATIONS

Office Action issued by the Japanese Patent Office in Japanese Patent Application No. 2010-276848 mailed May 27, 2014.
European Search Report issued in European Application No. 11848953.3 mailed Feb. 26, 2014.
Communication dated Sep. 24, 2015 from the Intellectual Property Office of P.R. China issued in corresponding application No. 201180031717.7.
Communication dated Mar. 23, 2015 from the State Intellectual Property Office of the P.R.C. In counterpart application No. 201180031717.7.
Communication dated Apr. 19, 2016 from the State Intellectual Property Office of the P.R.C. issued in corresponding Application No. 201180031717.7.

* cited by examiner

OPTICAL FIBER CUTTING DEVICE AND OPTICAL FIBER CUTTING METHOD

CROSS-REFERENCE TO RELATED APPLICATIONS

This application is a Continuation Application of PCT International Application No. PCT/JP2011/078187 (filed Dec. 6, 2011), which is in turn based upon and claims the benefit of priority from Japanese Patent Application No. 2010-276848 (filed Dec. 13, 2010), the entire contents of which are incorporated herein by reference.

BACKGROUND OF THE INVENTION

Field of the Invention

The present invention relates to an optical fiber cutting device and an optical fiber cutting method using the same.

Description of the Related Art

Broadband data communication services using optical fibers (FTTH) are rapidly and widely diffusing in recent years. As diffusion of FTTH progresses, the need for reduction of optical loss in optical fibers is growing. What should not be overlooked in optical loss is optical scattering at cut surfaces of terminal ends thereof. A cut surface should be, ideally, a plane surface perpendicular to the direction where the optical fiber runs, but is practically not an ideal plane surface. Therefore light scatters there and thus non-negligible optical loss occurs.

Various arts had been studied so as to form a cut surface close to an ideal surface. Japanese Patent Applications Laid-open Serial S63-153505 and 2005-321652 disclose related arts.

SUMMARY OF THE INVENTION

In many arts in the state of the art, to cut an optical fiber is done by pressing a cutting blade against the optical fiber. In accordance with studies by the present inventors, one of causes that lead a cut surface away from an ideal plane surface is deformation of the cut surface raised by the cutting blade deeply cutting into the optical fiber. The present invention has been achieved on the basis of this discovery of the source of the problem.

According to a first aspect of the present invention, a cutting device for cutting an optical fiber running in a first direction is comprised of a supporting piece having a free end and a fixed end and having resilience; a cutting blade supported by the supporting piece and so disposed as to come in contact with the optical fiber to make a right angle with the optical fiber at a point of the contact; and a driving device configured to press the supporting piece in a second direction in a plane perpendicular to the first direction, the second direction being not intersecting with the first direction.

According to a second aspect of the present invention, a cutting method is comprised of giving tension to an optical fiber running in a first direction; disposing a cutting blade supported by a supporting piece having a free end and a fixed end and having resilience so as to come in contact with the optical fiber to make a right angle with the optical fiber at a point of the contact; and pressing the supporting piece in a second direction in a plane perpendicular to the first direction, the second direction being not intersecting with the first direction.

DETAILED DESCRIPTION OF THE EXEMPLARY EMBODIMENTS

Exemplary embodiments of the present invention will be described hereinafter with reference to the appended drawings.

Figure 1:
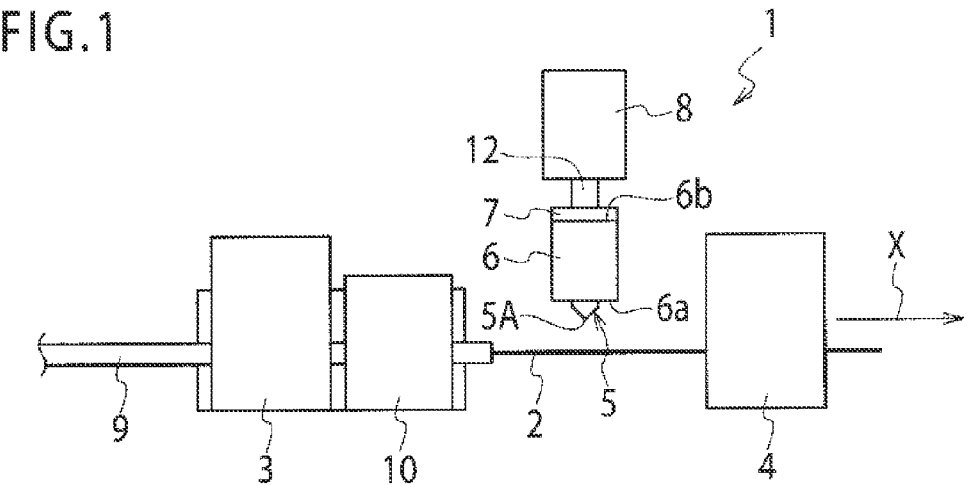
FIG. 1 is a schematic plan view of an optical fiber cutting device according to an embodiment of the present invention.

Referring to FIG. 1, an optical fiber cutting device 1 according to an embodiment of the present invention is comprised of gripping devices 3, 4 for gripping an optical fiber 2, a cutting blade 5, and a driving device 8 for driving the cutting blade 5 toward the optical fiber 2.

The first gripping device 3 and the second gripping device 4 are so disposed as to be apart from each other in a direction of an arrow X, and respectively grip the optical fiber 2 running in the direction of the arrow X. While a covering layer 9 may be frequently made to cover the optical fiber 2, a fiber holder 10 for holding the covering layer 9 is disposed close to the first gripping device 3. Thereby the fiber 2 is, at the side closer to the cutting blade 5 than the fiber holder 10, stripped of its covering layer 9 and is therefore placed in a naked condition.

The second gripping device 4 is preferably so configured as to be movable slightly in the direction of the arrow X, thereby being capable of properly applying tension to the optical fiber 2. Or, alternatively, the gripping devices 3, 4 may be configured so that the first gripping device 3, alone or in combination with the second gripping device 4, applies tension to the optical fiber 2.

Figure 2A:
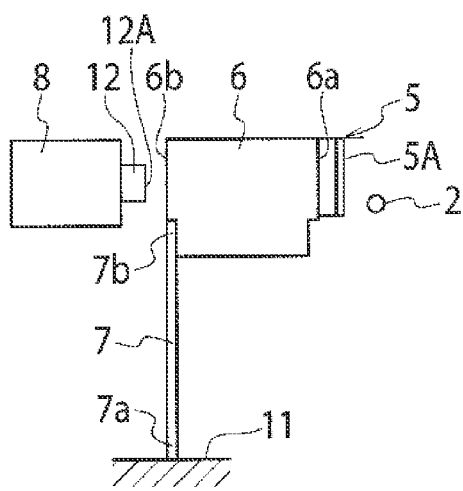
FIG. 2A is a side view of a cutting blade and a driving device of the optical fiber cutting device, which depicts a state before the cutting blade comes in contact with the optical fiber.
Figure 2B:
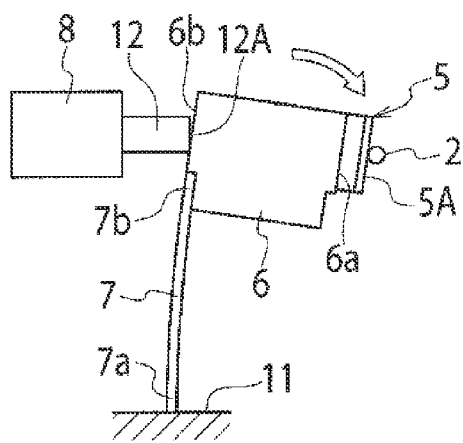
FIG. 2B is a side view of the cutting blade and the driving device, which depicts a state where the cutting blade comes in contact with the optical fiber.

Referring to FIGS. 2A and 2B, the cutting blade 5 is made of diamond for example and is comprised of a cutting edge 5A, which is a sharp ridge line formed by a pair of planes forming a proper angle for example. This angle is, not limited to, 60 degrees for example. Any proper hard material such as sapphire or boron nitride may be used instead of diamond. In addition, a hard material may be applied only to the cutting edge 5A and its close vicinity, or any proper material with a coating of a hard material on its surface may be applied to the cutting blade 5.

The cutting blade 5 is, having a proper blade holder interposed, supported by a supporting piece 7. The supporting piece 7 may, if possible, directly support the cutting blade 5. The blade holder 6 is at one end 6a coupled with the cutting blade 5 and at another end 6*b* coupled with the supporting piece 7. As to how to establish these couplings, adhesion, press-fitting, tightening with a screw or such, or any means equivalent to these means is applicable.

The supporting piece 7 is made of any proper resilient material and has an end 7*a* fixed to a stationary member 11 and another end 7*b* made free. As to how to establish coupling between the fixed end 7*a* and the stationary member 11, adhesion, welding, crimping by a screw or such, press-fitting, or any means equivalent to these means is applicable. As the resilient material, nickel silver, phosphor bronze, beryllium bronze, spring steels, or any metal equivalent to these materials may be used. Or, alternatively, any proper resin or ceramic may be used instead of these metals. The whole of the supporting piece 7 has proper resilience. The supporting piece 7 is preferably a strip shape, thereby suppressing deflection in its breadthwise direction but readily bending in a direction perpendicular thereto. The cutting edge 5A is directed in the readily-bending direction, which is perpendicular to the direction where the optical fiber 2 runs. The supporting piece 7 is preferably made to stand upright in the vertical direction but may be directed in any directions including the horizontal direction.

The driving device 8 is comprised of a mechanism for linear motion such as a ball screw to controllably make a plunger 12 advance and retreat. A pneumatic device, a hydraulic device, a cam mechanism or such may be used instead of the ball screw. The driving device 8 is so disposed that the direction in which the plunger 12 makes linear motion is in a plane perpendicular to, and does not intersect with, the direction in which the optical fiber 2 runs. While in the example of FIGS. 2A and 2B it deviates upward so as not to intersect with the direction where the optical fiber 2 runs, it may deviate downward. The driving device 8 is disposed in such a way, the force exerted by the driving device 8 to press the cutting blade 5 generates the moment of force about the contact point between the cutting edge 5A and the optical fiber 2.

Further the driving device 8 is so disposed that, in a state where the plunger 12 retreats as shown in FIG. 2A, its forefront 12A does not press the end 6*b* of the blade holder 6 or the supporting piece 7 and, in a state where the plunger 12 advances as shown in FIG. 2B, the forefront 12A presses the end 6*b* of the blade holder 6 or the supporting piece 7 toward the optical fiber 2. The mechanism for linear motion should have an enough range of motion to get the cutting edge 5A in contact with the optical fiber 2 when it makes the plunger 12 advance. Its driving force is for example, but not limited to, about 100 gram-weight. It may be properly determined in light of the elastic modulus of the supporting piece or the weights of the blade holder 6 and the cutting blade 5.

A controller may be added so as to control the travel distance and speed of the plunger 12. This prevents variation in states of cut surfaces of the optical fibers in every chances of cutting.

Figure 3A:
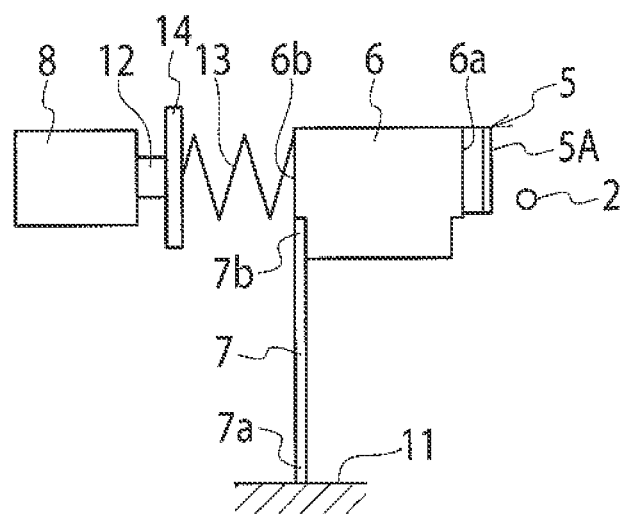
FIG. 3A is a side view showing a second example of the cutting blade and the driving device, which depicts a state before the cutting blade comes in contact with the optical fiber.
Figure 3B:
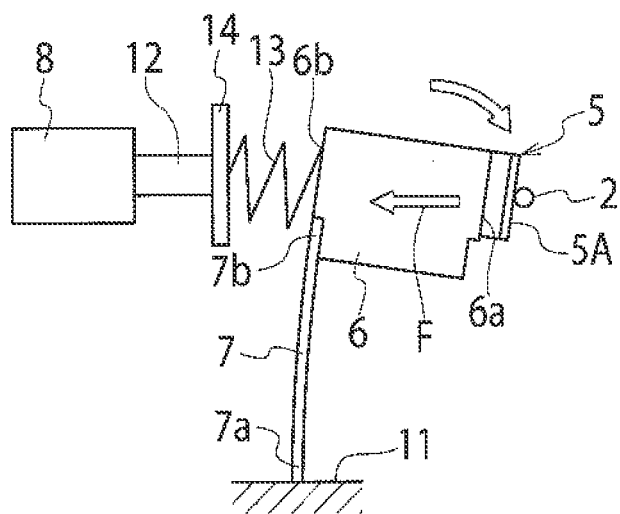
FIG. 3B is a side view showing the second example, which depicts a state where the cutting blade comes in contact with the optical fiber.

In between the driving device 8 and the blade holder 6 or the supporting piece 7, any proper buffer member may be interposed. In the example shown in FIGS. 3A and 3B, a spring 13 is interposed there. To assure support of the spring 13, the plunger 12 may be comprised of a supporting plate 14. Further, instead of the spring, a rubber, a resin foam, a damper or such may be applicable thereto. When the cutting edge 5A comes in contact with the optical fiber 2, faint shock F may occur. The buffer member absorbs the shock F, thereby protecting the cutting edge 5A and also preventing unfavorable influence on the shape of the cut surface.

Figure 4A:
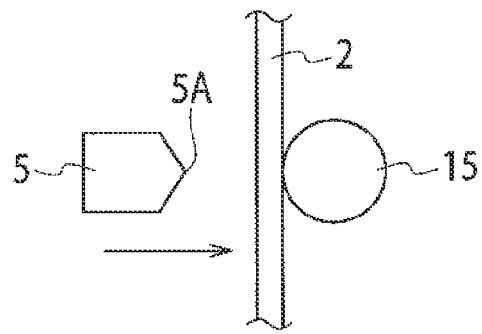
FIG. 4A is a plan view showing a third example of the cutting blade, which depicts a state before the cutting blade comes in contact with the optical fiber.
Figure 4B:
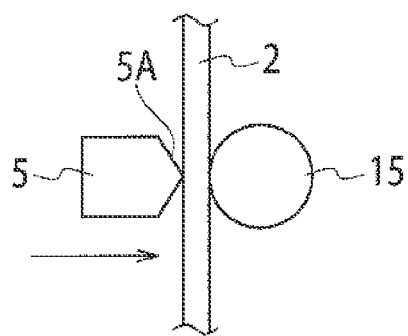
FIG. 4B is a plan view showing the third example, which depicts a state where the cutting blade comes in contact with the optical fiber.

Alternatively, instead of or in addition to the buffer member, a base block 15 to have the optical fiber between the cutting blade and the base block may be provided as shown in FIGS. 4A and 4B. This base block 15 prevents the optical fiber 2 from being deformed by pressure applied by the cutting blade 5. It enables the device to cut the optical fiber 2 with smaller pressing force as compression stress originating from the deformation is suppressed and therefore a score formed by the cutting blade 5 is made to readily propagate. This contributes to improvement of the shape of the cut surface.

Figure 5:
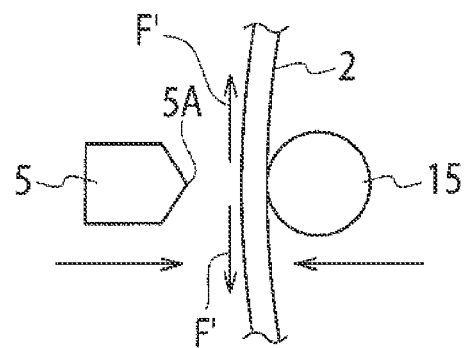
FIG. 5 is a plan view showing the third example, which depicts an example in which a base block is made to advance before the cutting blade comes in contact with the optical fiber.

Further alternatively, the base block 15 may be, as shown in FIG. 5, pressed against the optical fiber 2 so that tensile stress F' is generated in the optical fiber 2. To generate the tensile stress F' by pressing, the base block 15 is preferably formed in a proper shape having a convex surface, such as a sphere or a cylinder. This tensile stress F', as it promotes propagation of a given score, contributes to improvement of the shape of the cut surface.

Further preferably the optical fiber cutting device 1 has a proper sensor for determining whether the optical fiber 2 is cut off or not. As such a sensor exemplified is a sensor for detecting intermission of light transmission through the optical fiber 2, or a sensor for detecting tension of the optical fiber 2, but these are not limiting.

According to the aforementioned optical fiber cutting device 1, cutting the optical fiber 2 is executed in a way as described below.

The optical fiber 2 running in the direction of the arrow X is gripped by the gripping devices 3, 4, and proper tension is given thereto. The driving device 8 makes the plunger 12 advance to press and deform the supporting piece 7, thereby the cutting blade 5 supported by the supporting piece 7 comes in contact with the optical fiber 2 to make a right angle with the optical fiber 2.

After coming in contact, as the driving device 8 makes the supporting piece 7 further pressed, the pressing force, as described above, generates the moment of the force about the contact point, thereby giving rotation moment to the cutting blade 5 about the contact point. Thus the cutting blade 5 does not cut into the optical fiber 2 deeper, and instead goes around the periphery of the optical fiber 2, thereby the optical fiber 2 is cut off. Unlike a pendulum type, because the whole of the supporting piece 7 has resilience, the supporting piece 7 enables motion in that the cutting blade 5 goes around the periphery of the optical fiber 2.

Preferably upon detection of disconnection of the optical fiber 2 by means of a sensor, the driving device 8 starts making the plunger 12 retreat and thereby gets the cutting blade 5 apart from the optical fiber 2. Thereafter the optical fiber 2 is released from the gripping devices 3, 4 and the fiber holder 10.

As described above, the cutting blade comes in contact with the optical fiber to make a right angle therewith and does not deeply cut into the optical fiber but goes around the periphery thereof. A cut surface formed thereby has a shape close to an ideal plane surface perpendicular to the direction where the optical fiber runs. Therefore optical loss by light scattering at the cut surface is suppressed.

Although the invention has been described above by reference to certain exemplary embodiments of the invention, the invention is not limited to the exemplary embodiments described above. Modifications and variations of the embodiments described above will occur to those skilled in the art, in light of the above teachings.

INDUSTRIAL APPLICABILITY

A cutting device and a cutting method enabling favorable cutting to suppress optical loss of an optical fiber is provided.

What is claimed is:

1. A cutting device for cutting an optical fiber by applying a tension in a longitudinal direction of the optical fiber, the cutting device comprising:
    a single supporting piece having a free end and a fixed end and having resilience, the free end of the supporting piece being connected to a blade holder; a cutting blade held into the blade holder on the free end of the supporting piece; and
    a driving device having a plunger, the driving device being so disposed that the direction in which the plunger makes linear motion is in a plane perpendicular to, and does not intersect with, the direction in which the optical fiber runs, and configured to make the plunger advance to press the cutting blade, thereby the cutting blade supported by the supporting piece coming in contact with the optical fiber to make a right angle with the optical fiber, the plunger further pressing the cutting blade after coming in contact so that a pressing force generates a moment of the force about the contact point, thereby giving rotation moment to the cutting blade about the contact point and such that the cutting blade does not cut into the optical fiber deeper, and instead goes around the periphery of the optical fiber.

2. The cutting device of claim 1, further comprising:
    a buffer member that absorbs shock generated by the cutting blade coming in contact with the optical fiber.

3. The cutting device of claim 1, further comprising:
    a base block that is disposed such that the optical fiber is between the cutting blade and the base block.

4. The cutting device of claim 3, further comprising:
    a gripping portion configured to grip the optical fiber to provide tension to the optical fiber.

5. A cutting method comprising:
    providing tension to an optical fiber running in a longitudinal direction of the optical fiber;
    disposing a cutting blade held on one side of a blade holder supported by a single supporting piece which has a free end and a fixed end and has resilience, the blade holder being coupled with the supporting piece at the free end and the cutting blade being held into the blade holder on the free end; and
    making a plunger of a driving device advance to press the cutting blade, the driving device being so disposed that the direction in which the plunger makes linear motion is in a plane perpendicular to, and does not intersect with, the direction in which the optical fiber runs, thereby the cutting blade supported by the supporting piece coming in contact with the optical fiber to make a right angle with the optical fiber, further the plunger further pressing the cutting blade after coming in contact so that a pressing force generates a moment of the force about the contact point, thereby giving rotation moment to the cutting blade about the contact point and such that the cutting blade does not cut into the optical fiber deeper, and instead goes around the periphery of the optical fiber.

* * * * *